(12) United States Patent
Boss et al.

(10) Patent No.: US 8,898,291 B2
(45) Date of Patent: Nov. 25, 2014

(54) DYNAMICALLY EXPANDING COMPUTING RESOURCES IN A NETWORKED COMPUTING ENVIRONMENT

(75) Inventors: Gregory J. Boss, Saginaw, MI (US); Christopher J. Dawson, Arlington, VA (US); Rick A. Hamilton, II, Charlottesville, VA (US); Brian M. O'Connell, RTP, NC (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 13/204,905

(22) Filed: Aug. 8, 2011

(65) Prior Publication Data
US 2013/0042005 A1 Feb. 14, 2013

(51) Int. Cl.
G06F 15/173 (2006.01)
G06F 9/50 (2006.01)

(52) U.S. Cl.
CPC .................................. G06F 9/5011 (2013.01)
USPC ........... 709/224; 709/226; 718/100; 718/104; 718/105

(58) Field of Classification Search
USPC .................. 709/224, 226; 718/100, 104, 105
See application file for complete search history.

(56) References Cited

U.S. PATENT DOCUMENTS

| | | | |
|---|---|---|---|
| 7,269,599 B2 * | 9/2007 | Andreev et al. | 1/1 |
| 7,788,671 B2 * | 8/2010 | Black-Ziegelbein et al. | 718/105 |
| 2002/0049687 A1 * | 4/2002 | Helsper et al. | 706/45 |
| 2003/0177160 A1 * | 9/2003 | Chiu et al. | 709/100 |
| 2004/0181794 A1 * | 9/2004 | Coleman et al. | 718/104 |
| 2006/0095917 A1 * | 5/2006 | Black-Ziegelbein et al. | 718/104 |
| 2006/0104219 A1 * | 5/2006 | Kennedy | 370/254 |

(Continued)

OTHER PUBLICATIONS

Maitland, J., "Keeping Control Isn't Easy", Chapter 4: Cloud-Based Infrastructure, SearchCloudComputing.com, 13 pages.

(Continued)

*Primary Examiner* — Thomas Dailey
(74) *Attorney, Agent, or Firm* — William E. Schiesser; Keohane & D'Alessandro, PLLC

(57) ABSTRACT

Embodiments of the present invention provide an approach for dynamically expanding cloud capacity (e.g., computing resources), based on infrastructure needs. In a typical embodiment, an available capacity of a set (e.g., at least one) of computing resources in the networked computing environment will be determined. Then, a future capacity needed for processing a set of workloads in the networked computing environment will be forecasted. Such a forecast can be made based on multiple factors/approaches. For example, the forecast can be made based upon at least one of the following: an average consumption of the set of computing resources over a predetermined period of time, a periodic estimation of consumption of the set of computing resources, a scheduled consumption of the set of computing resources, and/or a potential capacity of the set of computing resources. In general, the scheduled consumption can be determined based on at least one resource consumption schedule stored in a computer data structure, while the potential capacity can be determined based upon a set of application events associated with the set of workloads. Regardless of the approach utilized, once the future capacity has been forecasted, it will be determined whether the future capacity exceeds the available capacity. If so, the available capacity of the set of computing resources will be expanded (e.g., hardware and/or software elements will be added to the networked computing infrastructure and/or made available) until the available capacity at least meets the future capacity.

19 Claims, 5 Drawing Sheets

(56) References Cited

U.S. PATENT DOCUMENTS

| | | |
|---|---|---|
| 2008/0080396 A1 | 4/2008 | Meijer et al. |
| 2010/0050172 A1 | 2/2010 | Ferris |
| 2010/0076856 A1 | 3/2010 | Mullins |
| 2011/0055398 A1 | 3/2011 | Dehaan et al. |
| 2011/0137805 A1 | 6/2011 | Brookbanks et al. |
| 2011/0138048 A1 | 6/2011 | Dawson et al. |
| 2011/0145094 A1 | 6/2011 | Dawson et al. |
| 2011/0153727 A1 | 6/2011 | Li |
| 2012/0089726 A1* | 4/2012 | Doddavula .................... 709/224 |

OTHER PUBLICATIONS

Mell et al., "The NIST Definition of Cloud Computing", National Institute of Standards and Technology, Information Technology Laboratory, Version 15, Oct. 7, 2009, 2 pages.

* cited by examiner

DYNAMICALLY EXPANDING COMPUTING RESOURCES IN A NETWORKED COMPUTING ENVIRONMENT

TECHNICAL FIELD

In general, the present invention relates to computing resource optimization. Specifically, the present invention relates to the dynamic expansion of computing resources in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, storage devices, among others.

Presently, many networked computing services (e.g., cloud computing services) are provided through infrastructure provisioning (e.g., within a relatively static hardware pool) whereby operating systems and computer software applications can be deployed and reconfigured. In a typical cloud computing environment, application images can be installed and overwritten, Internet Protocol (IP) addresses can be modified, and real and virtual processors are allocated to meet changing resource requirements. However, challenges can exist in that cloud computing environments are typically static entities whose infrastructures are fully managed. As such, expansion and/or contraction of the cloud computing environments typically occur through standard acquisition and installation of new hardware and/or other resources. Such an approach may be inefficient and/or not economically viable.

SUMMARY

Embodiments of the present invention provide an approach for dynamically expanding cloud capacity (e.g., computing resources), based on infrastructure needs. In a typical embodiment, an available capacity of a set (e.g., at least one) of computing resources in the networked computing environment will be determined. Then, a future capacity needed for processing a set of workloads in the networked computing environment will be forecasted. Such a forecast can be made based on multiple factors/approaches. For example, the forecast can be made based upon at least one of the following: an average consumption of the set of computing resources over a predetermined period of time, a periodic estimation of consumption of the set of computing resources, a scheduled consumption of the set of computing resources, and/or a potential capacity of the set of computing resources. In general, the scheduled consumption can be determined based on at least one resource consumption schedule stored in a computer data structure, while the potential capacity can be determined based upon a set of application events associated with the set of workloads. Regardless of the approach utilized, once the future capacity has been forecasted, it will be determined whether the future capacity exceeds the available capacity. If so, the available capacity of the set of computing resources will be expanded (e.g., hardware and/or software elements will be added to the networked computing infrastructure and/or made available) until the available capacity at least meets the future capacity.

A first aspect of the present invention provides a computer-implemented method for dynamically expanding computing resources in a networked computing environment, comprising: determining an available capacity of a set of computing resources in the networked computing environment; forecasting a future capacity needed for processing a set of workloads in the networked computing environment, the forecasting being based upon at least one of the following: a scheduled consumption of the set of computing resources, the scheduled consumption being determined based on at least one resource consumption schedule stored in a computer data structure, or a potential capacity of the set of computing resources, the potential capacity being determined based upon a set of application events associated with the set of workloads; determining whether the future capacity exceeds the available capacity; and expanding, responsive to the future capacity exceeding the available capacity, the set of computing resources until the available capacity at least meets the future capacity.

A second aspect of the present invention provides a system for dynamically expanding computing resources in a networked computing environment, comprising: a memory medium comprising instructions; a bus coupled to the memory medium; and a processor coupled to the bus that when executing the instructions causes the system to: determine an available capacity of a set of computing resources in the networked computing environment; forecast a future capacity needed for processing a set of workloads in the networked computing environment, the forecast being based upon at least one of the following: a scheduled consumption of the set of computing resources, the scheduled consumption being determined based on at least one resource consumption schedule stored in a computer data structure, or a potential capacity of the set of computing resources, the potential capacity being determined based upon a set of application events associated with the set of workloads; determine whether the future capacity exceeds the available capacity; and expand, responsive to the future capacity exceeding the available capacity, the set of computing resources until the available capacity at least meets the future capacity.

A third aspect of the present invention provides a computer program product for dynamically expanding computing resources in a networked computing environment the computer program product comprising a computer readable storage media, and program instructions stored on the computer readable storage media, to: determine an available capacity of a set of computing resources in the networked computing environment; forecast a future capacity needed for processing a set of workloads in the networked computing environment, the forecast being based upon at least one of the following: a scheduled consumption of the set of computing resources, the scheduled consumption being determined based on at least one resource consumption schedule stored in a computer data structure, or a potential capacity of the set of computing resources, the potential capacity being determined based upon a set of application events associated with the set of workloads; determine whether the future capacity exceeds the available capacity; and expand, responsive to the future capacity exceeding the available capacity, the set of computing resources until the available capacity at least meets the future capacity.

A fourth aspect of the present invention provides a method for deploying a system for dynamically expanding computing resources in a networked computing environment, comprising: providing a computer infrastructure being operable to:

determine an available capacity of a set of computing resources in the networked computing environment; forecast a future capacity needed for processing a set of workloads in the networked computing environment, the forecast being based upon at least one of the following: a scheduled consumption of the set of computing resources, the scheduled consumption being determined based on at least one resource consumption schedule stored in a computer data structure, or a potential capacity of the set of computing resources, the potential capacity being determined based upon a set of application events associated with the set of workloads; determine whether the future capacity exceeds the available capacity; and expand, responsive to the future capacity exceeding the available capacity, the set of computing resources until the available capacity at least meets the future capacity.

BRIEF DESCRIPTION OF THE DRAWINGS

These and other features of this invention will be more readily understood from the following detailed description of the various aspects of the invention taken in conjunction with the accompanying drawings in which.

Figure 1:
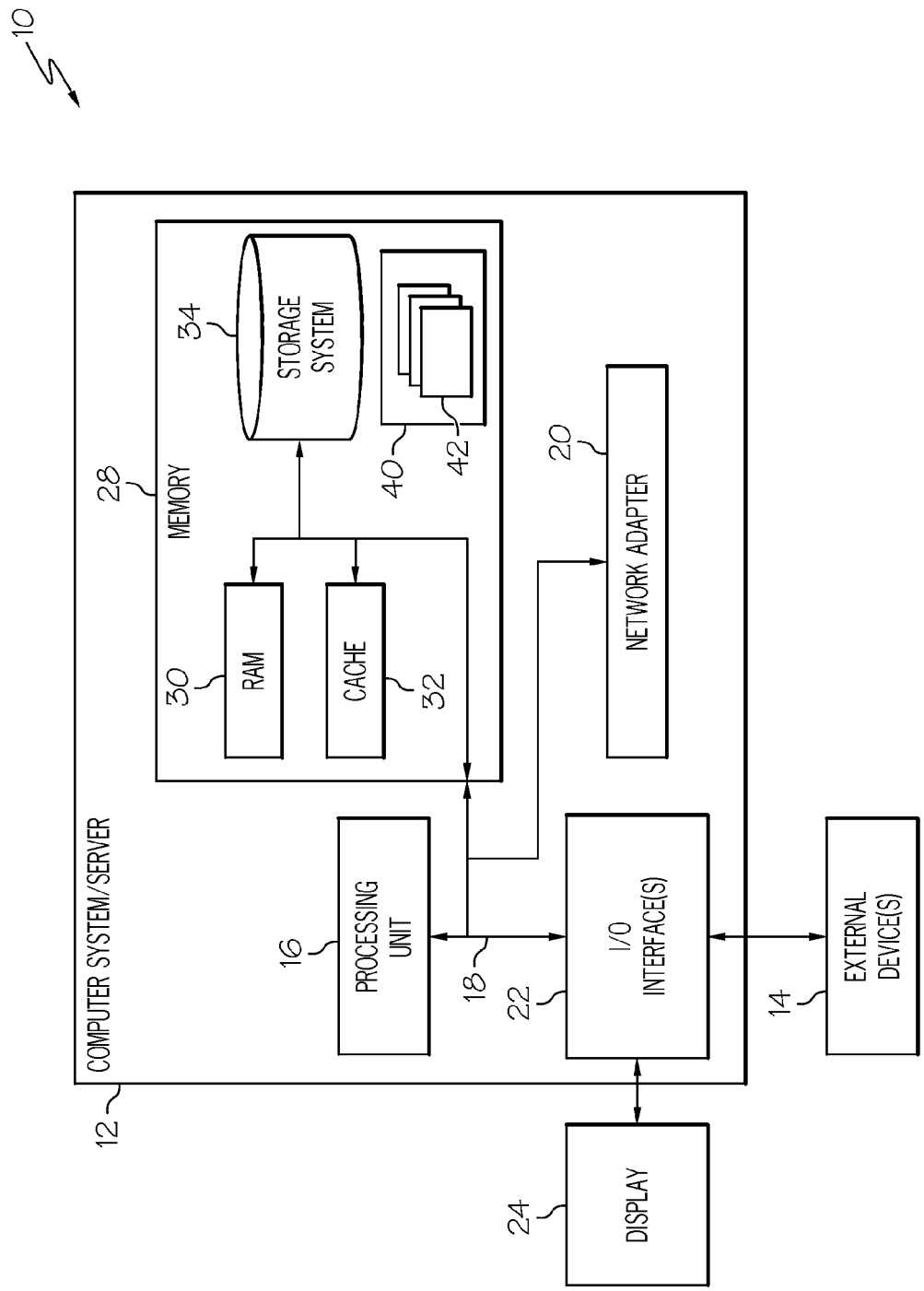
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for dynamically expanding cloud capacity (e.g., computing resources), based on infrastructure needs. In a typical embodiment, an available capacity of a set (e.g., at least one) of computing resources in the networked computing environment will be determined. Then, a future capacity needed for processing a set of workloads in the networked computing environment will be forecasted. Such a forecast can be made based on multiple factors/approaches. For example, the forecast can be made based upon at least one of the following: an average consumption of the set of computing resources over a predetermined period of time, a periodic estimation of consumption of the set of computing resources, a scheduled consumption of the set of computing resources, and/or a potential capacity of the set of computing resources. In general, the scheduled consumption can be determined based on at least one resource consumption schedule stored in a computer data structure, while the potential capacity can be determined based upon a set of application events associated with the set of workloads. Regardless of the approach utilized, once the future capacity has been forecasted, it will be determined whether the future capacity exceeds the available capacity. If so, the available capacity of the set of computing resources will be expanded (e.g., hardware and/or software elements will be added to the networked computing infrastructure and/or made available) until the available capacity at least meets the future capacity.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
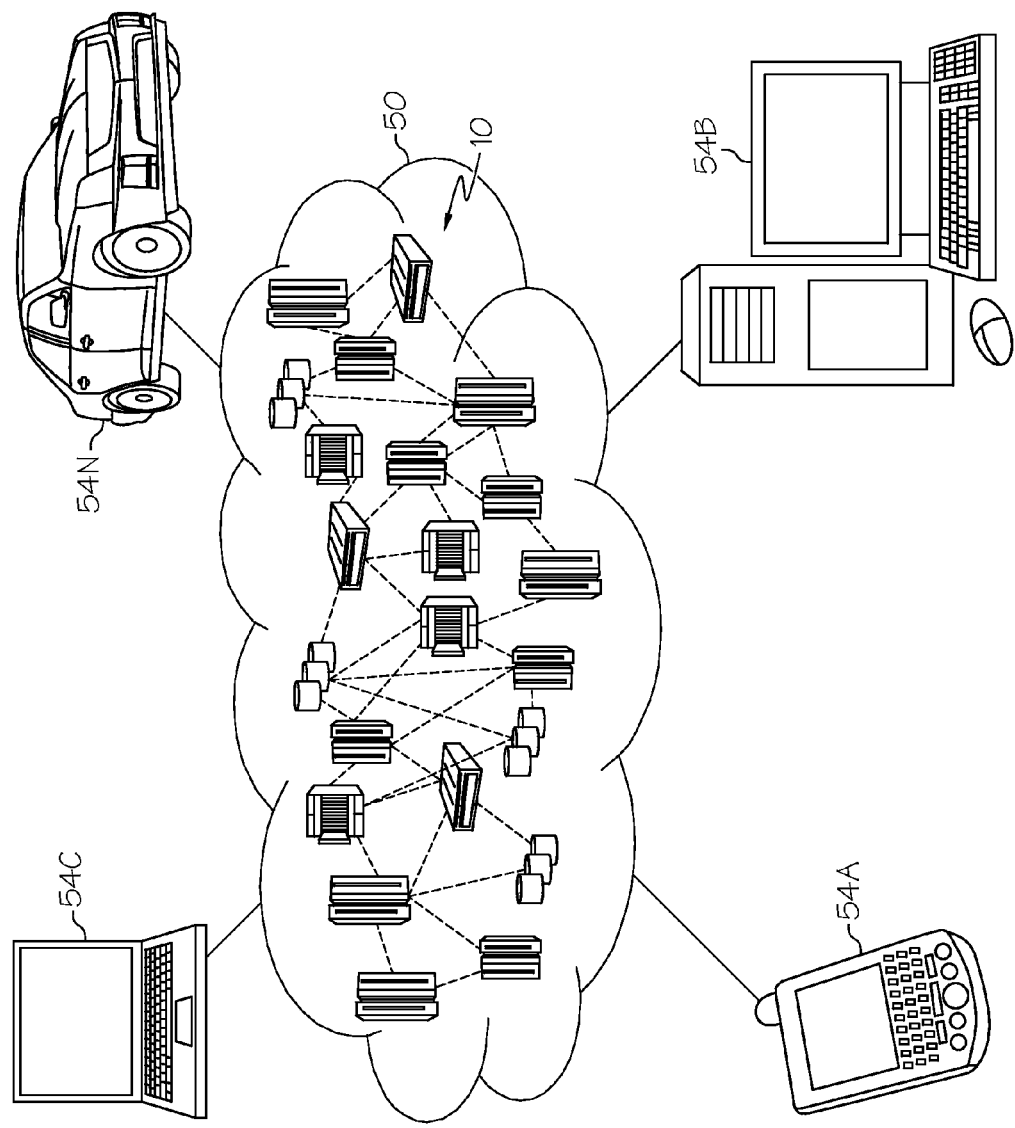
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
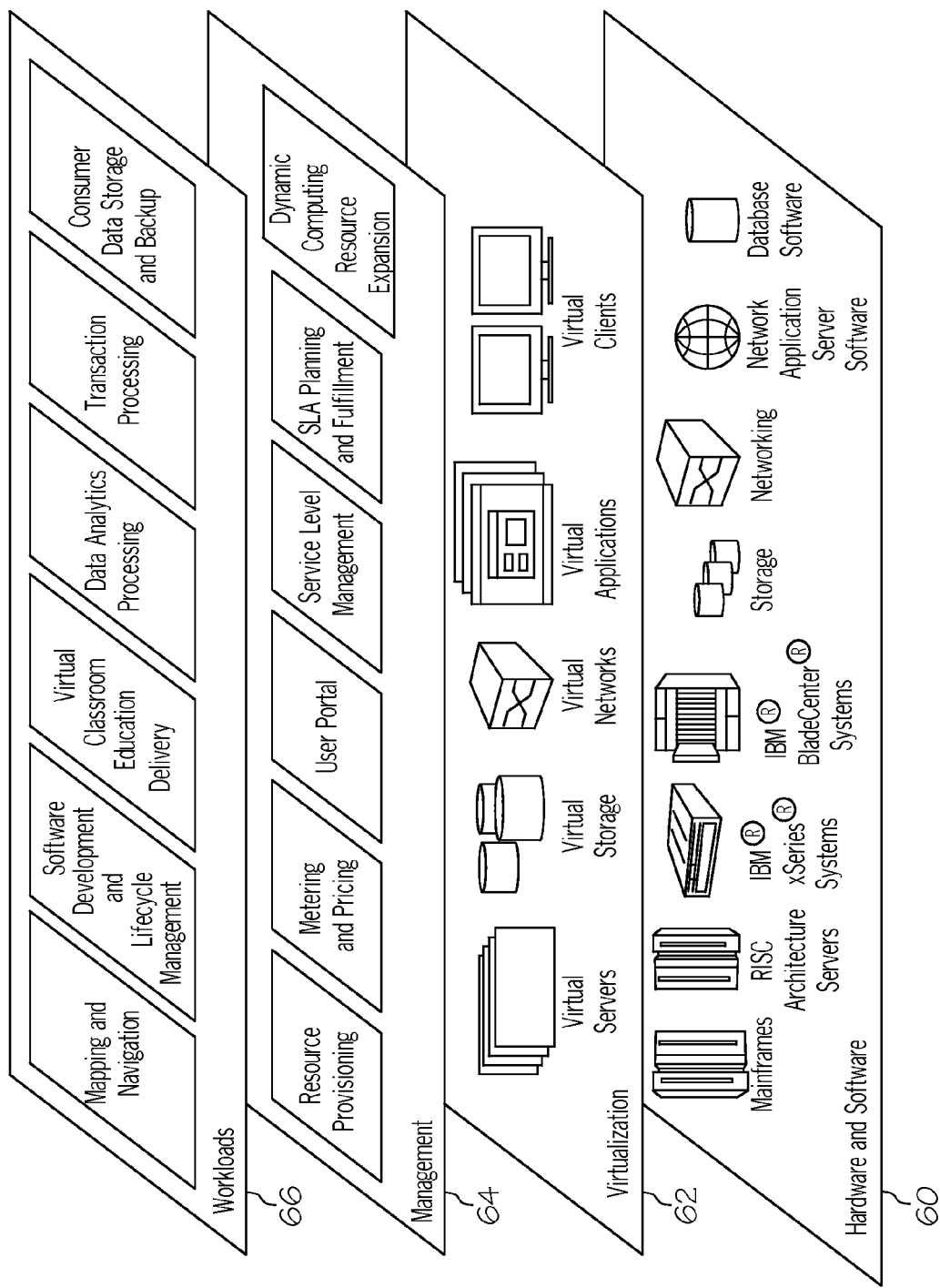
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer 64 is dynamic computing resource expansion function, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the dynamic computing resource expansion functionality of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
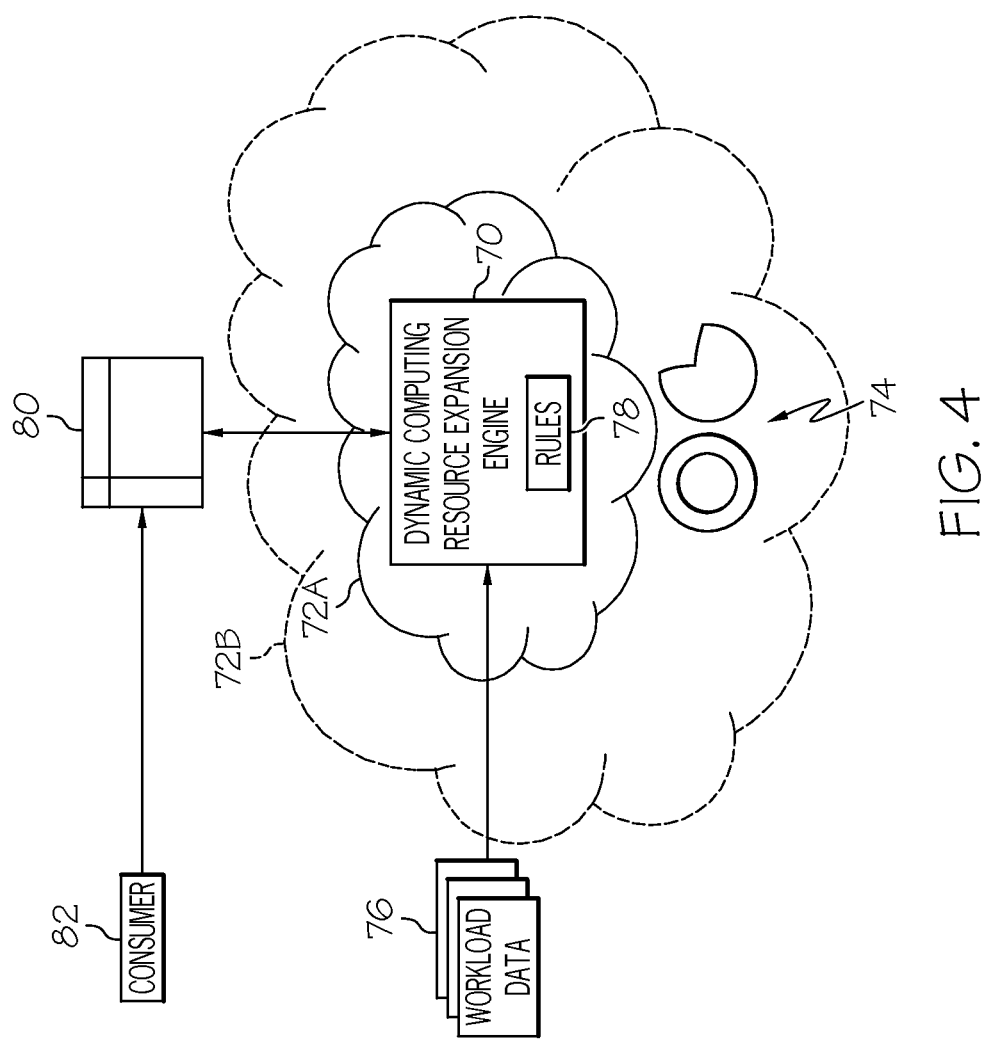
FIG. 4 depicts a system diagram according to an embodiment of the present invention.

As indicated above, embodiments of the present invention provide an approach for dynamically expanding computer resources to meet demands. A system diagram according to an aspect of the present invention is shown in FIG. 4. As depicted, a dynamic computing resources expansion engine (engine 70) is depicted. In general, engine 70 can be implemented as program 40 on computer system 12 of FIG. 1 and can implement the functions recited herein as depicted in management layer 64 of FIG. 3. In general, engine 70 comprises a rules engine that processes a set of rules 78 to determine whether to expand computing resources 74 (or to expand cloud 72A to includes computing resources 74). Specifically, engine 70 can process rules 78 to determine whether to expand cloud 72A to cloud 72B so as to include additional computing resources 74 (It is understood that although not explicitly shown, cloud 72A includes an initial of set computing resources). As will be further explained below, engine 70 will: determine a current capacity of cloud 72A and/or the computing resources therein; forecast a future capacity needed for processing a set of workloads 76; determine whether the future capacity exceeds the available capacity; and/or expand, responsive to the future capacity exceeding the available capacity, the set of computing resources until the available capacity at least meets the future capacity.

Along these lines, set of rules 78 can provide multiple approaches for determining whether computing/cloud resources need to be expanded. Illustrative methods contained in set of rules 78 are described below:

Limited Capacity—Expansion Method:

In this method, the cloud environment expands (from 72A to 72B) due to current or estimated future capacity needs. Current capacity needs may be determined through an analysis of the present operating capacity of elements within the cloud infrastructure. Those elements may include CPU, bandwidth, storage, etc. Future capacity requirements may be estimated through methods including average consumption over time, periodic estimation (repeated month-end processing), and other scheduling allowing customers to specify their expected requirements.

(a) Average Consumption: This method calculates the average consumption of all deployments within the current cloud environment over a specific time period (1 day, 1 week, etc.). If the deployments exceed the resources available, the expansion and relocation methods may be invoked to acquire additional resources.

(b) Periodic Estimation: This method calculates, over a large time interval, the resource consumption peaks. These peaks, along with the time they occur, are noted. Analysis is performed to detect if any of these peaks are periodic in nature. For example, a batch processing job from one customer may run once a week for 4 hours and consume large amounts of CPU. This method will detect these periodic resource consumption events and produce an overlapping schedule of expected peaks. If those overlapping peaks exceed the compute capacity of the cloud, then expansion methods may be invoked to meet the estimated demand.

(c) Scheduled Consumption: Cloud consumer 82 may be enticed to use manual or automated methods to schedule the consumption on the cloud (e.g., via a resource consumption schedule 80 stored in a computer data structure/memory or the like such as memory 28 of FIG. 1). Cloud consumers may indicate by using a user interface or a software service their expected and upcoming peaks and base level resource consumption. This method will produce an overlapping schedule of expected peaks. If those overlapping peaks exceed the compute capacity of the cloud, then expansion methods may be invoked to meet the estimated demand. Cloud consumers may be enticed to estimate the baseline and peak consumption (e.g., through price breaks, discounts, etc., for accurate estimates).

(d) Capacity Forecast by Application Event Association: This method takes advantage of the cloud's dynamic global footprint. Specifically, capacity forecasting entails monitoring for application events which can be associated with large peaks and valleys in hardware resource demand. As an example, when application "A" in New York exceeds a certain number of concurrent users, it may be observed that 80% of the time, a resource shortage is experienced in Tokyo within 10 hours. This could be the result of a chain reaction in stock market applications, which follows market openings across time zones. Whatever the cause, certain application events could be associated with known probabilities of future cloud capacity shortages.

Environmental Parameters—Hybrid Method:

This method analyzes potentially harmful weather conditions (e.g., excessive heat, hurricanes, tornados, floods, etc.) or other environmental parameters (e.g., impending power outages, solar flares, etc. which could exceed the ability of back-up supplies to run required systems) in cloud provider locations that may necessitate an automatic movement from one cloud provider to another. The analysis may be based on national weather service warnings, or via manual inputs. In one embodiment, automatic parsing of national weather service warnings occurs. If the probability threshold of a disaster exceeds a specific threshold, automatic movement procedures within a cloud environment are invoked. In another embodiment, if the potential danger exceeds a threshold, appropriate resources are contacted to evaluate if a migration is required. Migration priority may be established based on several criteria such as customer size, instances running in other geographic areas, deployment time, etc.

Figure 5:
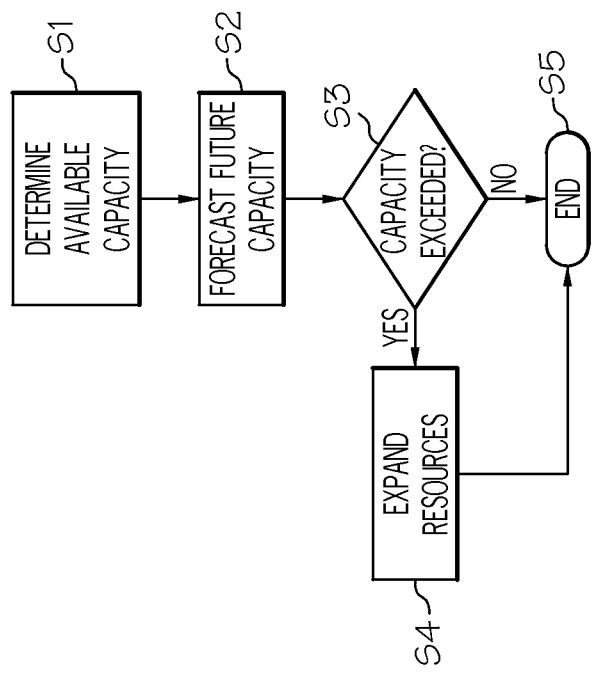
FIG. 5 depicts a method flow diagram according to an embodiment of the present invention.

Referring now to FIG. 5, a method flow diagram according to an embodiment of the present invent is shown. In step S1, an available capacity of a set of computing resources in the networked computing environment is determined. In step S2, a future capacity needed for processing a set of workloads in the networked computing environment is forecasted. As indicated above, this can occur based upon multiple methods such as one of the following: a scheduled consumption of the set of computing resources (e.g., as scheduled in a resource consumption schedule or the like), a potential capacity of the set of computing resources (e.g., as determined based upon a set of application events associated with the set of workloads), an average consumption of the set of computing resources over a predetermined period of time, and/or a periodic estimation of consumption of the set of computing resources. In step S3, it will be determined whether the future capacity exceeds the available capacity. If not, the process can end in step S5. If however, the future capacity exceeds the available capacity, the set of computing resources and/or cloud environment can be expanded in step S4 until the available capacity at least meets the future capacity.

While shown and described herein as a computing resource expansion solution, it is understood that the invention further provides various alternative embodiments. For example, in one embodiment, the invention provides a computer-readable/useable medium that includes computer program code to enable a computer infrastructure to provide computing resource expansion functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide computing resource expansion functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for computing resource expansion. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for dynamically expanding computing resources in a networked computing environment, comprising:
    defining the networked computing environment as a cloud computing environment comprising a set of functional abstraction layers through which a plurality of cloud computing nodes offer a set of computing resources to a set of client computing devices;
    determining an available capacity of the set of computing resources in the networked computing environment;
    forecasting a future capacity needed for processing a set of workloads in the networked computing environment, the forecasting being based upon the following:
        a scheduled consumption of the set of computing resources, the scheduled consumption being determined based on at least one resource consumption schedule stored in a computer data structure, and
        a potential capacity of the set of computing resources, the potential capacity being determined based upon a set of application events associated with the set of workloads, the application events being associated with known probabilities of future capacity shortages;
    determining whether the future capacity exceeds the available capacity; and
    expanding, responsive to the future capacity exceeding the available capacity, the set of computing resources until the available capacity at least meets the future capacity.

2. The computer-implemented method of claim 1, the future capacity being further forecasted based upon at least one of the following: an average consumption of the set of computing resources over a predetermined period of time; and a periodic estimation of consumption of the set of computing resources.

3. The computer-implemented method of claim 2, the periodic estimation identifying peaks in resource consumption over an interval of time.

4. The computer-implemented method of claim 1, the scheduled consumption of the set of computing resources identifying overlapping peaks in usage of the set of computing resources.

5. The computer-implemented method of claim 1, further comprising receiving at least one scheduled instance of consumption of the set of computing resources in the resource consumption schedule.

6. The computer-implemented method of claim 1, the forecasting comprising:
    monitoring for the application events; and
    identifying a set of peaks and valleys in consumption of the set of computing resources based on the application events.

7. A system for dynamically expanding computing resources in a networked computing environment, comprising:
- a memory medium comprising instructions;
- a bus coupled to the memory medium; and
- a processor coupled to the bus that when executing the instructions causes the system to:
  - define the networked computing environment as a cloud computing environment comprising a set of functional abstraction layers through which a plurality of cloud computing nodes offer a set of computing resources to a set of client computing devices;
  - determine an available capacity of the set of computing resources in the networked computing environment;
  - forecast a future capacity needed for processing a set of workloads in the networked computing environment, the forecast being based upon the following:
    - a scheduled consumption of the set of computing resources, the scheduled consumption being determined based on at least one resource consumption schedule stored in a computer data structure, and
    - a potential capacity of the set of computing resources, the potential capacity being determined based upon a set of application events associated with the set of workloads, the application events being associated with known probabilities of future capacity shortages;
  - determine whether the future capacity exceeds the available capacity; and
  - expand, responsive to the future capacity exceeding the available capacity, the set of computing resources until the available capacity at least meets the future capacity;
  - wherein the set of functional abstraction layers comprise a hardware and software layer, a virtualization layer, a management layer, and a workloads layer.

8. The system of claim 7, the future capacity being further forecasted based upon at least one of the following: an average consumption of the set of computing resources over a predetermined period of time; and a periodic estimation of consumption of the set of computing resources.

9. The system of claim 8, the periodic estimation identifying peaks in resource consumption over an interval of time.

10. The system of claim 7, the scheduled consumption of the set of computing resources identifying overlapping peaks in usage of the set of computing resources.

11. The system of claim 7, the memory medium further comprising instructions for causing the system to receive at least one scheduled instance of consumption of the set of computing resources in the resource consumption schedule.

12. The system of claim 7, the memory medium further comprising instructions for causing the system to:
- monitor for the application events; and
- identify a set of peaks and valleys in consumption of the set of computing resources based on the application events.

13. A computer program product for dynamically expanding computing resources in a networked computing environment, the computer program product comprising a non-transitory computer readable storage media, and program instructions stored on the computer readable storage media, to:
- define the networked computing environment as a cloud computing environment comprising a set of functional abstraction layers through which a plurality of cloud computing nodes offer a set of computing resources to a set of client computing devices;
- determine an available capacity of the set of computing resources in the networked computing environment;
- forecast a future capacity needed for processing a set of workloads in the networked computing environment, the forecast being based upon the following:
  - a scheduled consumption of the set of computing resources, the scheduled consumption being determined based on at least one resource consumption schedule stored in a computer data structure, and
  - a potential capacity of the set of computing resources, the potential capacity being determined based upon a set of application events associated with the set of workloads, the application events being associated with known probabilities of future capacity shortages;
- determine whether the future capacity exceeds the available capacity; and
- expand, responsive to the future capacity exceeding the available capacity, the set of computing resources until the available capacity at least meets the future capacity.

14. The computer program product of claim 13, the future capacity being further forecasted based upon at least one of the following: an average consumption of the set of computing resources over a predetermined period of time; and a periodic estimation of consumption of the set of computing resources.

15. The computer program product of claim 14, the periodic estimation identifying peaks in resource consumption over an interval of time.

16. The computer program product of claim 13, the scheduled consumption of the set of computing resources identifying overlapping peaks in usage of the set of computing resources.

17. The computer program product of claim 13, the non-transitory computer readable storage media further comprising instructions to receive at least one scheduled instance of consumption of the set of computing resources in the resource consumption schedule.

18. The computer program product of claim 13, the non-transitory computer readable storage media further comprising instructions to:
- monitor for the application events; and
- identify a set of peaks and valleys in consumption of the set of computing resources based on the application events.

19. A method for deploying a system for dynamically expanding computing resources in a networked computing environment, comprising:
- providing a computer infrastructure being operable to:
  - define the networked computing environment as a cloud computing environment comprising a set of functional abstraction layers through which a plurality of cloud computing nodes offer a set of computing resources to a set of client computing devices;
  - determine an available capacity of the set of computing resources in the networked computing environment;
  - forecast a future capacity needed for processing a set of workloads in the networked computing environment, the forecast being based upon the following:
    - a scheduled consumption of the set of computing resources, the scheduled consumption being determined based on at least one resource consumption schedule stored in a computer data structure, and
    - a potential capacity of the set of computing resources, the potential capacity being determined based upon a set of application events associated with the set of workloads, the application events being associated with known probabilities of future capacity shortages;

determine whether the future capacity exceeds the available capacity; and expand, responsive to the future capacity exceeding the available capacity, the set of computing resources until the available capacity at least meets the future capacity;

wherein the set of functional abstraction layers comprise a hardware and software layer, a virtualization layer, a management layer, and a workloads layer.

* * * * *